Sept. 23, 1958 — F. E. RADDE — 2,852,975
FACE TYPE HEADREST
Filed May 24, 1957 — 2 Sheets-Sheet 1

INVENTOR.
Frank E. Radde

Sept. 23, 1958     F. E. RADDE     2,852,975
FACE TYPE HEADREST
Filed May 24, 1957     2 Sheets-Sheet 2
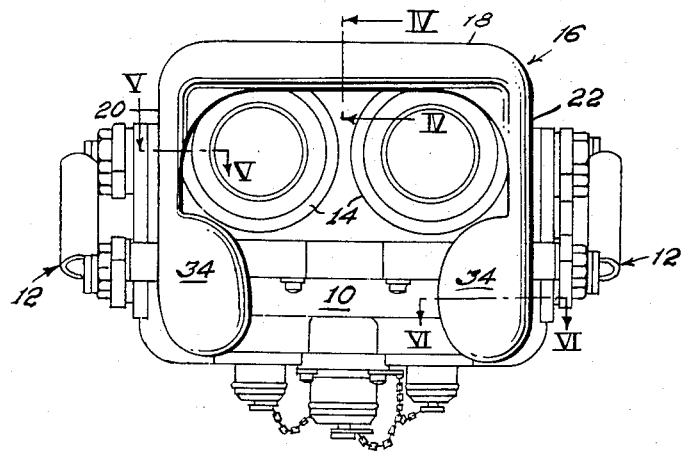
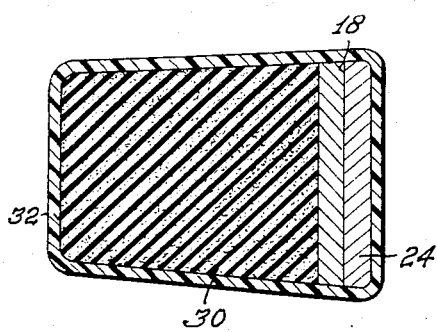
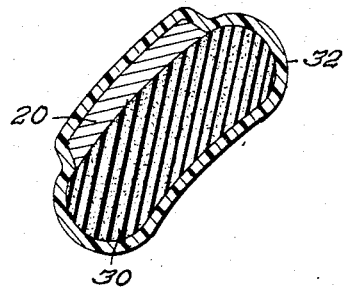
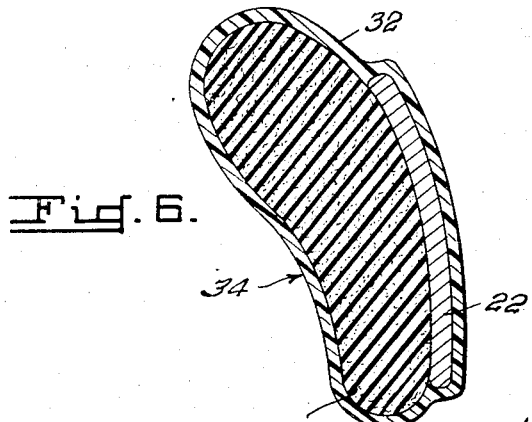
INVENTOR.
Frank E. Radde United States Patent Office 2,852,975
Patented Sept. 23, 1958

2,852,975
FACE TYPE HEADREST

Frank E. Radde, Ann Arbor, Mich., assignor to the United States of America as represented by the Secretary of the Army Application May 24, 1957, Serial No. 661,552

1 Claim. (Cl. 88—1)

The invention relates to headrests, and particularly to face type headrests commonly used with optical devices and the like.

Inasmuch as many optical devices require accurate spacing and location of the observer's eye from the eyepiece, the use of headrests and eyepieces for this purpose has become well known, however, prior headrests and eyepieces for binoculars, periscopes, gunsights and other optical devices usually contact the observer at small local areas about the eyes and eye sockets. Such localized contact prevents extended use of the optical device due to the discomfort of the observer and prevents use of head movements alone to change the position of adjustably mounted optical devices.

It is thus an object of the invention to design a headrest for use with an adjustably mounted optical device which will permit the device to be adjusted by head movements alone, yet is comfortable for the observer, and does not cause excessive pressures to be imposed on local areas of the face.

It is a further object of the invention to design a headrest for optical devices which contact a substantial part of the observer's face and include the cheek bones.

Another object of the invention is to produce a face type headrest wherein foam rubber is utilized as a padding and the foam rubber is encased in a flexible plastic sheath.

These and other objects of the invention will become apparent when reviewed with regard to the accompanying description and included drawings wherein:

Fig. 3 is an elevational end view of the invention as seen from the right of Fig. 1.

Figs. 4, 5 and 6 are cross-sectional views of the invention taken along the lines IV—IV, V—V and VI—VI, respectively, of Fig. 3.

The headrest of the invention may be used with any type of optical device wherein it is desired to maintain the observer's eyes in a given relation to the eyepiece or eyepieces, however, the invention is particularly useful with an adjustably mounted optical device wherein adjustment of the position of the device is made by movements of the observer's head.

Figure 1:
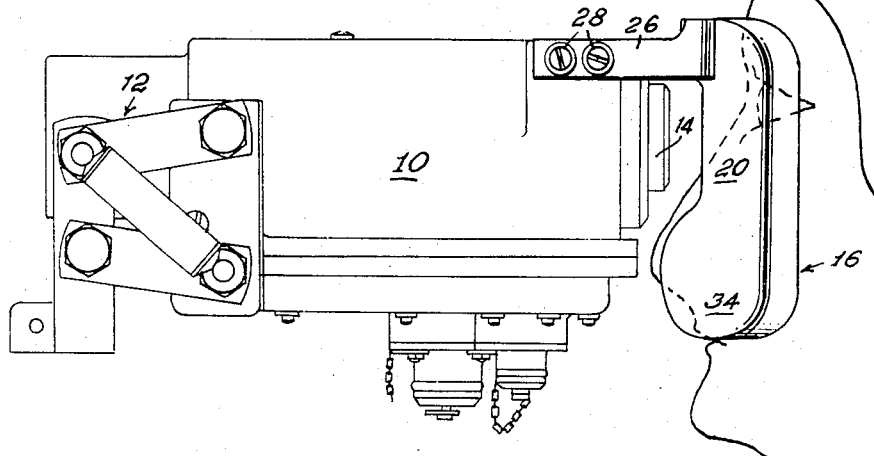
Fig. 1 is an elevational view of the invention as used with an adjustably mounted optical device.

In Fig. 1 an optical device 10, such as a gunsight, periscope, telescope, binoculars, etc. is mounted by a pivotally supported linkage 12 permitting both horizontal and vertical movement of device 10. A pair of eyepieces 14 are located at one end of optical device 10 and the headrest 16 is attached to device 10 adjacent to eyepieces 14.

Generally, the headrest 16 consists of an inverted U-shaped facial contact portion consisting of a base 18 and a pair of legs 20 and 22 extending at approximately right angles from base 18. A U-shaped support 24 is affixed, by welding, rivets or like means, to the base 18 such that the brackets 26, which form the legs of support 24, project at right angles to base 18. Brackets 26 are drilled near the ends whereby screws 28 may be utilized to attach the headrest 16 to the optical device 10.

Figure 2:
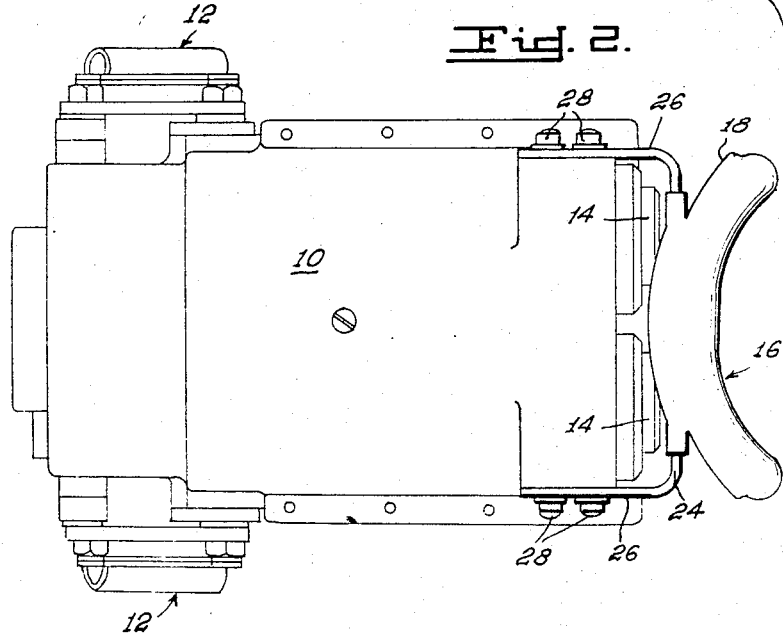
Fig. 2 is a plan view of the invention as attached to the optical device of Fig. 1.

The base 18 is of an arcuate configuration, note Fig. 2, so as to conform to the observer's forehead and is substantially padded to provide a close fitting, yet comfortable, contact with the forehead. Preferably, the padding 30, Fig. 4, consists of a layer of foam rubber cemented to base 18 encased in a sheath of flexible plastic covering 32, such as neoprene. It will be noted the covering 32 completely encompasses the padding, base 18 and support 24 presenting an attractive and uniform exterior appearance.

The legs 20 and 22 likewise are of arcuate cross section to better fit the facial contours and are padded throughout their length with foam rubber and shielded by covering 32. At the lower half of legs 20 and 22 the padding 30 is enlarged to form a bulbous pad 34 adapted to contact the observer's cheekbones over a substantial area, pad 34 is also encased by covering 32 giving the headrest 16 a uniform exterior appearance throughout. The pad 34 is of a concave-convex cross-section to snugly fit the cheekbone portion of the observer's face, and it will be noted in Fig. 3 that the pads 34 of legs 20 and 22 are arranged in opposing relation to each other to form a pocket to receive the face of the observer.

The dimensions of headrest 16 are such that the correct distance between the observer's eye and the eyepieces 14 will be maintained upon the observer placing the forehead against the padded base 18 and cheekbones against the pads 34. As the area of the headrest 16 in contact with the forehead and cheekbones is substantial, and as the facial bone structure of the observer is near the surface of the face at these locations, the observer may comfortably move the optical device 10 by movements of the head alone, without causing excessive pressures to be applied to any portion of the face.

As the facial size and contour of various observers may differ slightly, limited adjustment of the headrest 16 may be made by bending the legs 20 and 22 away from or toward each other.

It will thus be understood that the invention discloses a headrest which engages a substantial portion of the observer's face permitting the attached optical device to be comfortably adjusted by head movements. The use of foam rubber and the plastic covering insure snug, yet soft, engagement with the observer's head eliminating sharp corners and projections which may cut into the observer's face.

It is not intended the invention be limited to the particular construction of the illustrated embodiment, and it is understood that various modifications may be apparent to those skilled in the art without departing from the spirit and scope of the invention.

I claim:

A face type headrest for an optical device comprising an inverted U-shaped face contacting portion, said portion comprising an arcuate base adapted to engage the forehead of the observer and a pair of legs extending from said base; resilient padding completely covering said base and said legs, said resilient padding comprising foam rubber cemented to said base and said legs and a neoprene covering encompassing said foam rubber; said padding forming enlarged bulbous pads on the inside of said legs adapted to engage substantially the entire cheekbone areas of the observer, and a support affixed to said base whereby said headrest may be attached to said optical device.

References Cited in the file of this patent

UNITED STATES PATENTS

| | | |
|---|---|---|
| 553,146 | Aitchison | Jan. 14, 1896 |
| 2,147,089 | Catasta | Feb. 14, 1939 |
| 2,316,164 | Hoffeditz | Apr. 13, 1943 |
| 2,518,632 | O'Brien et al. | Aug. 15, 1950 |
| 2,647,438 | Milne et al. | Aug. 4, 1953 |

FOREIGN PATENTS

| | | |
|---|---|---|
| 658,339 | Great Britain | Oct. 10, 1951 |